United States Patent [19]

Heard, Sr.

[11] 4,244,111
[45] Jan. 13, 1981

[54] DIAL INDICATOR HOLDERS

[76] Inventor: James E. Heard, Sr., 7450 Oak Grove Ave., Justice, Ill. 60458

[21] Appl. No.: 32,860

[22] Filed: Apr. 24, 1979

[51] Int. Cl.³ .............................................. G01B 3/22
[52] U.S. Cl. .................... 33/180 R; 33/412; 248/231
[58] Field of Search ............... 33/412, 172 R, 180 R; 248/231, DIG. 4

[56] References Cited

U.S. PATENT DOCUMENTS

| | | | |
|---|---|---|---|
| 1,952,863 | 3/1934 | Hueber | 248/231 |
| 2,634,939 | 4/1953 | Voss | 248/231 |
| 2,726,058 | 12/1955 | Foltz | 33/412 |
| 3,631,604 | 1/1972 | Schenavar | 33/412 |
| 3,664,029 | 5/1972 | Glucoft et al. | 33/412 |

FOREIGN PATENT DOCUMENTS 547581  9/1942  United Kingdom ................ 248/231

*Primary Examiner*—Richard R. Stearns

[57] ABSTRACT

An easily attachable shaft aligning device comprised with a gauge supporting post that will support dial indicators that make contact with the second shaft to be aligned. This indicator holder has a metal base which houses two levers with hooks on their outer ends that receive any selected link of a chain that encircles the shaft to be aligned by screwing the dial indicator support post into the metal base against an inner part of the levers lifting the outer hooked ends of the lever and thereby tightening the chain to said shaft.

1 Claim, 4 Drawing Figures

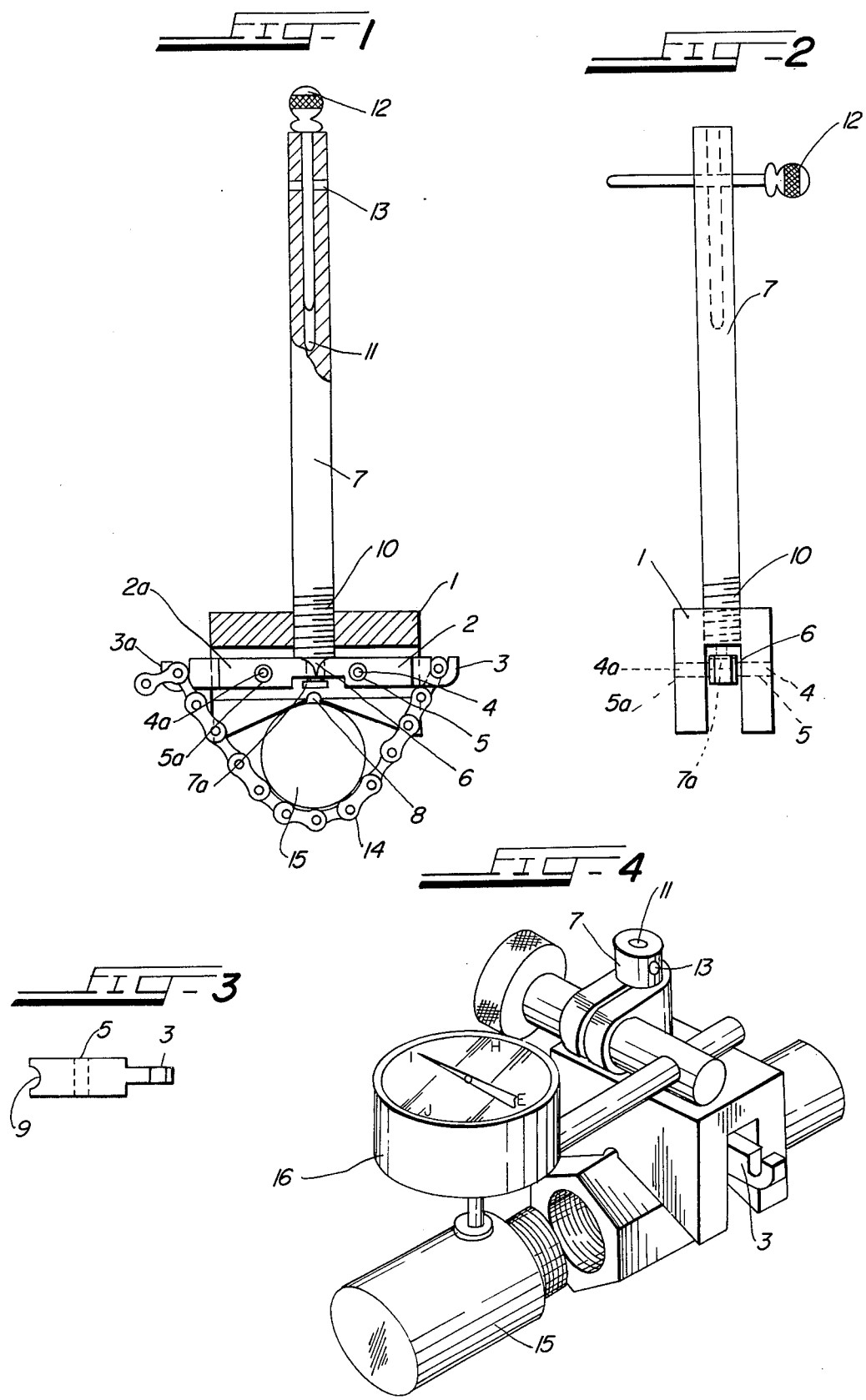

DIAL INDICATOR HOLDERS

While the magnetic base and G clamp holders are well known and now in use they are limited to applications using certain shaped or sized shafts. The G clamp is limited in that various sized G clamps must be used for differently sized shafts. The magnetic base holder is large and bulky and cannot be used in close or small places as can this invention. The magnetic base holder can also give a false reading due to its magnetic properties.

This unique invention provides the ability of the dial indicator holder to be used with any shaped and/or any sized shaft using suitable lengths of chain which attach onto two levers with hooks on their outer ends. These levers extend from inside the metal base and are secured by two pivot pins. The dial support post has a groove in which the levers fit. This groove holds the levers in a fixed position when the dial indicator holder is being mounted or detached from shaft. The support post may vary in length to suit application.

OBJECTS OF THE INVENTION

1. The principal object of this invention is to provide an improved tool to support dial gauge indicators for shaft alignment of turbines, compressors, pumps, etc.

2. It is also an object of this invention to provide a tool which will not have to be disassembled and reassembled for different applications.

3. Another object of this invention is to provide a small, compact tool which can be easily transported and readily utilized from application to application.

DESCRIPTION OF DRAWING

The aforementioned objectives will become apparent by observation of the accompanying drawing which shows:

FIG. 1 is a sectional side elevation of the metal base and support post in a tightened position fastened to a round shaft;

FIG. 2 is an end elevation of the metal base and support post;

FIG. 3 is a top elevation of the tightening lever showing the opening which the knob of the support post enters to hold the levers in position for attaching the chain;

FIG. 4 is an isometric drawing of the dial indicator holder resting on a hex shaft with a dial indicator mounted on the support post (of variable length) with the contact point of the dial indicator on a round shaft, less chain.

With continuing reference to the drawing, it is shown that the dial indicator holder has a metal base 1 providing the housing for the levers 2 & 2a which include hooked ends 3 & 3a used to receive the chain 14 which encircles the shaft 15 to be aligned.

The levers are secured in the metal base 1 housing by pivot pins 4 & 4a which are set thru pivot pin holes 5 & 5a and held to a fastening or releasing position by groove 6 which is encircled by opening 9 in levers 2 and 2a.

The relief opening 8 in the metal base 1 makes allowance for burrs, or damaged points or flattened corners of hex shafts and eliminated the relocating of the dial indicator holder should this occur where the base is placed on a specific point of a shaft 15. The support post 7, contains support post threads 10, which screw into the metal base 1 pushing the inner part of the levers down raising the outer portion to tighten the chain 14 around the shaft 15. The support post 7 also contains a vertical hole 11 within that is used as a self storage compartment for the tightening pin 12 which when placed into the horizontal hole 13 is used as a wrench for tightening the support post 7 which pivots levers 2 & 2a up or down when tightening or loosening chain 14. The support post 7 also contains a knob 7a which when loosening the support post 7 said knob 7a passes into the opening 9 of levers 2 and 2a to hold hooked ends 3 and 3a in a down position so chain 14 can be easily detached.

I claim:

1. A dial indicator holder for aligning shafts comprising a metal base capable of making spaced line contact with the surfaces of cylindrical or hexagonal shaft members; said base having a threaded opening therein receiving a support post threaded at one end and having a tranverse bore at its other end for receiving a pin to facilitate rotation of said support post; said base pivotally supporting a pair of opposed levers for movement in a plane othogonal to the shaft member axis, inner ends of said levers engaging the threaded end of said support post and being pivotally moved in response to turning of said threaded support post, the outer ends of said levers having hooked portions to receive a chain for clamping said base to said shaft member.

* * * * *